United States Patent
Jenkins et al.

(10) Patent No.: US 7,031,420 B1
(45) Date of Patent: Apr. 18, 2006

(54) SYSTEM AND METHOD FOR ADAPTIVELY DESKEWING PARALLEL DATA SIGNALS RELATIVE TO A CLOCK

(75) Inventors: Philip Nord Jenkins, Bau Claire, WI (US); Frank N. Cornett, Chippewa Falls, WI (US)

(73) Assignee: Silicon Graphics, Inc., Mountainview, CA (US)

( * ) Notice: Subject to any disclaimer, the term of this patent is extended or adjusted under 35 U.S.C. 154(b) by 0 days.

(21) Appl. No.: 09/476,678

(22) Filed: Dec. 30, 1999

(51) Int. Cl.
*H04L 25/00* (2006.01)

(52) U.S. Cl. ............... 375/371; 375/375; 327/149; 327/152

(58) Field of Classification Search ......... 375/371, 375/375; 327/141, 152, 149, 161; 370/516, 370/517
See application file for complete search history.

(56) References Cited

U.S. PATENT DOCUMENTS

| | | | |
|---|---|---|---|
| 4,375,051 A | 2/1983 | Theall | 333/17 |
| 4,477,713 A | 10/1984 | Cook et al. | 219/124.34 |
| 4,514,749 A | 4/1985 | Shoji | 357/68 |
| 4,525,684 A | 6/1985 | Majefski | |
| 4,587,445 A | 5/1986 | Kanuma | 307/443 |
| 4,799,214 A | 1/1989 | Kaku | |
| 4,823,184 A | 4/1989 | Belmares-Sarabia et al. | 358/27 |
| 4,896,272 A | 1/1990 | Kurosawa | 364/491 |
| 4,918,685 A | 4/1990 | Tol et al. | |
| 4,926,066 A | 5/1990 | Maini et al. | 307/303 |
| 4,982,428 A | 1/1991 | Agazzi et al. | |
| 5,144,174 A | 9/1992 | Murakami | 307/608 |
| 5,194,765 A | 3/1993 | Dunlop et al. | 307/443 |
| 5,274,836 A | 12/1993 | Lux | |
| 5,295,132 A | 3/1994 | Hashimoto et al. | 370/13 |
| 5,315,175 A | 5/1994 | Langner | 307/443 |
| 5,394,528 A | 2/1995 | Kobayashi et al. | 395/325 |
| 5,410,263 A * | 4/1995 | Waizman | 327/141 |
| 5,416,606 A | 5/1995 | Katayama et al. | 358/467 |
| 5,481,567 A | 1/1996 | Betts et al. | 375/261 |
| 5,487,095 A * | 1/1996 | Jordan et al. | 375/371 |
| 5,490,252 A | 2/1996 | Macera et al. | 395/200.1 |
| 5,521,836 A | 5/1996 | Hartong et al. | 364/491 |
| 5,535,223 A | 7/1996 | Horstmann et al. | 371/27 |
| 5,537,068 A * | 7/1996 | Konno | 327/115 |
| 5,544,203 A | 8/1996 | Casasanta et al. | 375/376 |
| 5,555,188 A | 9/1996 | Chakradhar | 364/490 |
| 5,579,336 A | 11/1996 | Fitzgerald et al. | 375/219 |
| 5,583,454 A | 12/1996 | Hawkins et al. | 326/81 |

(Continued)

OTHER PUBLICATIONS

"Low Power Quad Differential Line Driver with Cut-Off", *National Semiconductor, F100K ECL 300 Series Databook and Design Guide*, pp. 2-54-2-60, (1992).

(Continued)

*Primary Examiner*—Temesghen Ghebretinsae
(74) *Attorney, Agent, or Firm*—Schwegman, Lundberg, Woessner & Kluth, P.A.

(57) ABSTRACT

A system and method of reducing skew between a plurality of signals transmitted with a transmit clock is described. Skew is detected between the received transmit clock and each of received data signals. Delay is added to the clock or to one or more of the plurality of data signals to compensate for the detected skew. Each of the plurality of delayed signals is compared to a reference signal to detect changes in the skew. The delay added to each of the plurality of delayed signals is updated to adapt to changes in the detected skew.

41 Claims, 11 Drawing Sheets

U.S. PATENT DOCUMENTS

| | | | | |
|---|---|---|---|---|
| 5,598,442 | A | * | 1/1997 | Gregg et al. ............... 375/354 |
| 5,604,450 | A | | 2/1997 | Borkar et al. ................ 326/82 |
| 5,621,774 | A | * | 4/1997 | Ishibashi et al. ............ 375/371 |
| 5,631,611 | A | | 5/1997 | Luu et al. .................. 333/17.3 |
| 5,657,346 | A | | 8/1997 | Lordi et al. ................ 375/224 |
| 5,757,658 | A | | 5/1998 | Rodman et al. ............ 364/491 |
| 5,778,214 | A | * | 7/1998 | Taya et al. .................. 713/400 |
| 5,778,308 | A | | 7/1998 | Sroka et al. ............... 455/115 |
| 5,787,268 | A | | 7/1998 | Sugiyama et al. .......... 395/500 |
| 5,790,838 | A | | 8/1998 | Irish et al. .................. 395/555 |
| 5,793,259 | A | | 8/1998 | Chengson .................... 331/78 |
| 5,802,103 | A | | 9/1998 | Jeong .......................... 375/220 |
| 5,811,997 | A | | 9/1998 | Chengson et al. .......... 327/112 |
| 5,828,833 | A | | 10/1998 | Belville et al. ......... 395/187.01 |
| 5,832,047 | A | * | 11/1998 | Ferraiolo et al. ........... 375/356 |
| 5,844,954 | A | | 12/1998 | Casasanta et al. .......... 375/373 |
| 5,847,592 | A | | 12/1998 | Gleim et al. ............... 327/403 |
| 5,870,340 | A | | 2/1999 | Ohsawa ................. 365/189.02 |
| 5,872,471 | A | | 2/1999 | Ishibashi et al. .............. 327/98 |
| 5,898,729 | A | | 4/1999 | Boezen et al. ............. 375/259 |
| 5,910,898 | A | | 6/1999 | Johannsen ................. 364/489 |
| 5,915,104 | A | | 6/1999 | Miller ......................... 395/309 |
| 5,920,213 | A | | 7/1999 | Graf, III ..................... 327/144 |
| 5,922,076 | A | | 7/1999 | Garde ......................... 713/600 |
| 5,929,717 | A | | 7/1999 | Richardson et al. ....... 333/17.3 |
| 5,946,712 | A | * | 8/1999 | Lu et al. ..................... 711/167 |
| 5,948,083 | A | * | 9/1999 | Gervasi ....................... 710/62 |
| 6,005,895 | A | | 12/1999 | Perino et al. ............... 375/288 |
| 6,016,553 | A | | 1/2000 | Schneider et al. ............ 714/21 |
| 6,029,250 | A | | 2/2000 | Keeth ......................... 713/400 |
| 6,031,847 | A | * | 2/2000 | Collins et al. .............. 370/508 |
| 6,075,832 | A | * | 6/2000 | Geannopoulos et al. .... 375/375 |
| 6,084,930 | A | | 7/2000 | Dinteman ................... 375/354 |
| 6,100,735 | A | | 8/2000 | Lu .............................. 327/158 |
| 6,104,223 | A | | 8/2000 | Chapman et al. .......... 327/276 |
| 6,127,872 | A | | 10/2000 | Kumata ..................... 327/276 |
| 6,150,875 | A | | 11/2000 | Tsinker ...................... 327/552 |
| 6,175,598 | B1 | | 1/2001 | Yu et al. ..................... 375/257 |
| 6,178,206 | B1 | | 1/2001 | Kelly et al. ................ 375/257 |
| 6,181,912 | B1 | | 1/2001 | Miller et al. | |
| 6,259,737 | B1 | | 7/2001 | Fung et al. | |
| 6,294,924 | B1 | | 9/2001 | Ang et al. ..................... 326/30 |
| 6,294,937 | B1 | | 9/2001 | Crafts et al. ................ 327/158 |
| 6,310,815 | B1 | | 10/2001 | Yamagata et al. ..... 365/230.03 |
| 6,334,163 | B1 | | 12/2001 | Dreps et al. ................ 710/129 |
| 6,373,908 | B1 | | 4/2002 | Chan | |
| 6,417,713 | B1 | | 7/2002 | DeRyckere et al. ......... 327/271 |
| 6,430,242 | B1 | | 8/2002 | Buchanan et al. .......... 375/371 |
| 6,486,723 | B1 | | 11/2002 | DeRyckere et al. ......... 327/271 |
| 6,557,110 | B1 | * | 4/2003 | Sakamoto et al. .......... 713/503 |
| 6,597,731 | B1 | | 7/2003 | Shuholm | |
| 2001/0033630 | A1 | * | 10/2001 | Hassoun et al. ............ 375/376 |

OTHER PUBLICATIONS

Djordjevic, A.R., et al., "Time Domain Response of Multiconductor Transmission Lines", *Proceedings of the IEEE, 75* (*6*), 743-64, (Jun. 1987).

Im, G., et al., "Brandwidth-Efficient Digital Transmission over Unshielded Twisted-Pair Wiring", *IEEE Journal on Selected Areas in Communications, 13* (*9*), 1643-1655, (Dec. 1995).

Mooney, R., et al., "A 900 Mb/s Bidirectional Signaling Scheme", *IEEE Journal of Solid-State Circuits, 30* (*12*), 1538-1543, (Dec. 1995).

Tankahshi, T., et al., "110GB/s Simultaneous Bi-Directional Transceiver Logic Synchronized with a System Clock", *IEEE International Solid-State Circuits Conference*, 176-177, (1999).

"The SA27 library includes programmable delay elements DELAYMUXO and DELAYMUXN. How are these cells used?", *IBM Delaymuxn Book*, pp. 1-6, (Feb. 1999).

Lee, K., et al., "A CMOS Serial Link for 1 Gbaud Fully Duplexed Data Communication", *Symposium on VLSI Circuits, US, NY IEEE, XP000501054*, 125-126, (Jun. 9, 1994).

*Lattice Semiconductor Corporation,* http://www.latticesemi.com,(2002),7 pgs.

* cited by examiner

SYSTEM AND METHOD FOR ADAPTIVELY DESKEWING PARALLEL DATA SIGNALS RELATIVE TO A CLOCK

STATEMENT OF RIGHTS IN INVENTION

The United States Government has rights to use this invention pursuant to subcontract B338314 issued by the University of California, which operates Lawrence Livermore National Laboratory for the United States Department of Energy under Contract No. W-7405-ENG-48.

TECHNICAL FIELD OF THE INVENTION

The present invention relates generally to signaling between electrical components and in particular to a system and method for adaptively deskewing parallel data signals relative to a clock.

BACKGROUND OF THE INVENTION

In the multiprocessor computer systems environment, clock pulses from a common source are distributed for controlling many widely separated circuit modules. Time delays associated with the passage of clock and data signals through parallel, but not identical, paths are not uniform; signals can arrive at their destination in skewed time relation to each other. Source synchronous clocking is often utilized whereby parallel data signals and a synchronous clock are distributed to widely separated circuit modules. The forwarded clock acts as a capture clock for data at the destination. The capture clock edge is optimally positioned between successive data edges so the receiving capturing device has equal setup and hold time margins. Often, finite time delay is added to each signal to correct for skew and to optimally position the forwarded capture clock edge relative to the deskewed data edges.

It is possible to limit a certain amount of signal skew by applying careful attention to layout and design. Examples of methods to reduce clock pulse skew are shown in U.S. Pat. No. 4,514,749 by Skoji and U.S. Pat. No. 4,926,066 by Maimi et al. Such methods fail, however, to correct for skew from various divergent clock pulse path interconnections. In addition, such skew compensations, once implemented, cannot accommodate variations in skew caused by such factors as component aging, operating environment variations, and so forth.

Within a computer system, data is passed from register to register, with varying amounts of processing performed between registers. Registers store data present at their inputs either at a system clock transition or during a phase of the system clock. Skew in the system clock signal impacts register-to-register transfers, i.e., skew may cause a register to store data either before it has become valid or after it is no longer valid.

As system clock periods shrink there is increasing pressure on the computer architect to increase the amount of determinism in the system design. Clock skew, like setup time, hold time and propagation delay, increase the amount of time that data is in an indeterminable state. System designers must be careful that this indeterminable state does not fall within the sampling window of a register in order to preserve data integrity.

For the reasons stated above, and for other reasons stated below which will become apparent to those skilled in the art upon reading and understanding the present specification, there is a need in the art for a system and method for reducing skew between parallel signals within electrical systems.

SUMMARY OF THE INVENTION

The above mentioned problems involved in the parallel transfer of data at high speeds are addressed by the present invention and will be understood by reading and studying the following specification.

According to one aspect of the present invention, a system and method of reducing skew between a plurality of signals transmitted with a transmit clock is described. Skew is detected between the received transmit clock and each of received data signals. Delay is added to the clock or to one or more of the plurality of data signals to compensate for the detected skew. Each of the plurality of delayed signals is compared to a reference signal to detect changes in the skew. The delay added to each of the plurality of delayed signals is updated to adapt to changes in the detected skew.

According to another aspect of the present invention, a circuit is described for reducing skew between a plurality of signals transmitted with a channel clock, wherein the plurality of signals includes a first and a second signal. The circuit includes first and second data capture circuits, a delay line controller and a channel clock interface. The first data capture circuit is connected to the first signal and includes a first delay line and a first skew detection circuit connected to the first delay line. The second data capture circuit is connected to the second signal and includes a second delay line and a second skew detection circuit connected to the second delay line. The delay line controller is connected to the first and second delay lines and to the first and second skew detection circuits. The delay line controller receives skew indicator signals representing skew from each of said first and second skew detection circuits and controls delay added by said first and second delay lines. The channel clock interface is connected to the first and second skew detection circuits. The channel clock interface frequency doubles the channel clock to form a doubled channel clock, which is then used by the first and second skew detection circuits to detect skew.

According to yet another aspect of the present invention, a skew detection circuit includes a phase comparator, wherein the phase comparator compares phase of an input signal to a clock signal to generate a clock early signal and a data early signal.

According to yet another aspect of the present invention, a delay line controller for controlling a plurality of delay lines, wherein each delay line receives an input signal and generates a delayed signal as a function of the input signal, includes a plurality of skew indicator signal inputs, wherein each skew indicator signal input is capable of receiving a skew indicator signal reflecting skew between one of the delayed input signals and a reference signal, a digital filter connected to each of said plurality of skew indicator signal inputs, wherein each digital filter generates a delay control signal associated with one of the delayed input signals and control logic for controlling the plurality of delay lines as a function of the delay control signals.

According to yet another aspect of the present invention, a communication system includes a transmitter and a receiver. The transmitter transmits a plurality of signals in parallel, wherein the plurality of signals includes a first and a second signal. The receiver includes a deskewing circuit, wherein the deskewing circuit includes a first data capture circuit connected to the first signal, wherein the first data capture circuit includes a first delay line and a first skew detection circuit connected to the first delay line, a second data capture circuit connected to the second signal, wherein the second data capture circuit includes a second delay line and a second skew detection circuit connected to the second delay line, a delay line controller connected to the first and second delay lines and the first and second skew detection circuits, wherein the delay line controller receives skew indicator signals representing skew from each of said first and second skew detection circuits and controls delay added by said first and second delay lines, and a channel clock interface connected to the first and second skew detection circuits, wherein said channel clock interface frequency doubles the channel clock to form a doubled channel clock. The first and second skew detection circuits detect skew as a function of the doubled channel clock.

According to yet another aspect of the present invention, a communication interface for use on an integrated circuit includes a transmitter and a receiver. The transmitter transmits a plurality of signals in parallel, wherein the plurality of signals includes a first and a second signal. The receiver includes a deskewing circuit, wherein the deskewing circuit includes a first data capture circuit connected to the first signal, wherein the first data capture circuit includes a first delay line and a first skew detection circuit connected to the first delay line, a second data capture circuit connected to the second signal, wherein the second data capture circuit includes a second delay line and a second skew detection circuit connected to the second delay line, a delay line controller connected to the first and second delay lines and the first and second skew detection circuits, wherein the delay line controller receives skew indicator signals representing skew from each of said first and second skew detection circuits and controls delay added by said first and second delay lines, and a channel clock interface connected to the first and second skew detection circuits, wherein said channel clock interface frequency doubles the channel clock to form a doubled channel clock. The first and second skew detection circuits detect skew as a function of the doubled channel clock.

According to yet another aspect of the present invention, a system and method for establishing the phase relationship between a plurality of signals, including a first signal, is described. Signal deskewing circuitry is initialized, wherein initializing includes driving the circuitry with a predefined sequence of data edges. A phase comparator is driven with a clock having 2 edges per data bit and a 50% duty cycle, wherein driving includes sensing the clock and determining an error signal indicating drift from the 50% duty cycle. A phase relationship is determined between the first signal and the clock and delay for the first signal is set as a function of the phase relationship. The delay is then modified as a function of changes in the phase relationship.

According to yet another aspect of the present invention, in a system having a channel clock, a plurality of channel signals and delay lines for delaying the channel clock and the plurality of channel signals, a system and method is described for adaptively deskewing delays between the plurality of channel signals. Phase relationships are determined between the channel clock and the plurality of channel signals, wherein determining includes generating skew indicator signals for each of the plurality of signals. Each skew indicator signal is filtered to reduce jitter and a Data Minus Clock (DMC) register is initialized for each channel signal. The value of the DMC register corresponding to a particular signal is increased if that signal has arrived early with respect to a reference signal; the value of the DMC register corresponding to a particular signal is decreased if that signal has arrived late with respect to the reference signal. A minimum DMC value from the plurality of DMC registers is determined and, if the minimum DMC value is greater than zero, the number of delay increments of the clock delay line is set to a minimum. If the minimum DMC value is less than zero, delay of the clock delay line is set to the absolute value of the minimum DMC value. A channel signal delay is calculated for each of the channel signals, wherein calculating a delay includes determining a difference between the minimum DMC value and the DMC value corresponding to each of the plurality of channel signals. Each of the channel signal delay lines is set to delay its channel signal by the channel signal delay calculated for each of the channel signals.

BRIEF DESCRIPTION OF THE DRAWINGS

In the following drawings, where like numbers indicate similar function.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The system and method described below can be used to reduce skew between parallel data signals relative to a clock. In one embodiment, skew is reduced relative to an optimally positioned (orthogonal) capture clock edge as is described below.

Figure 1:
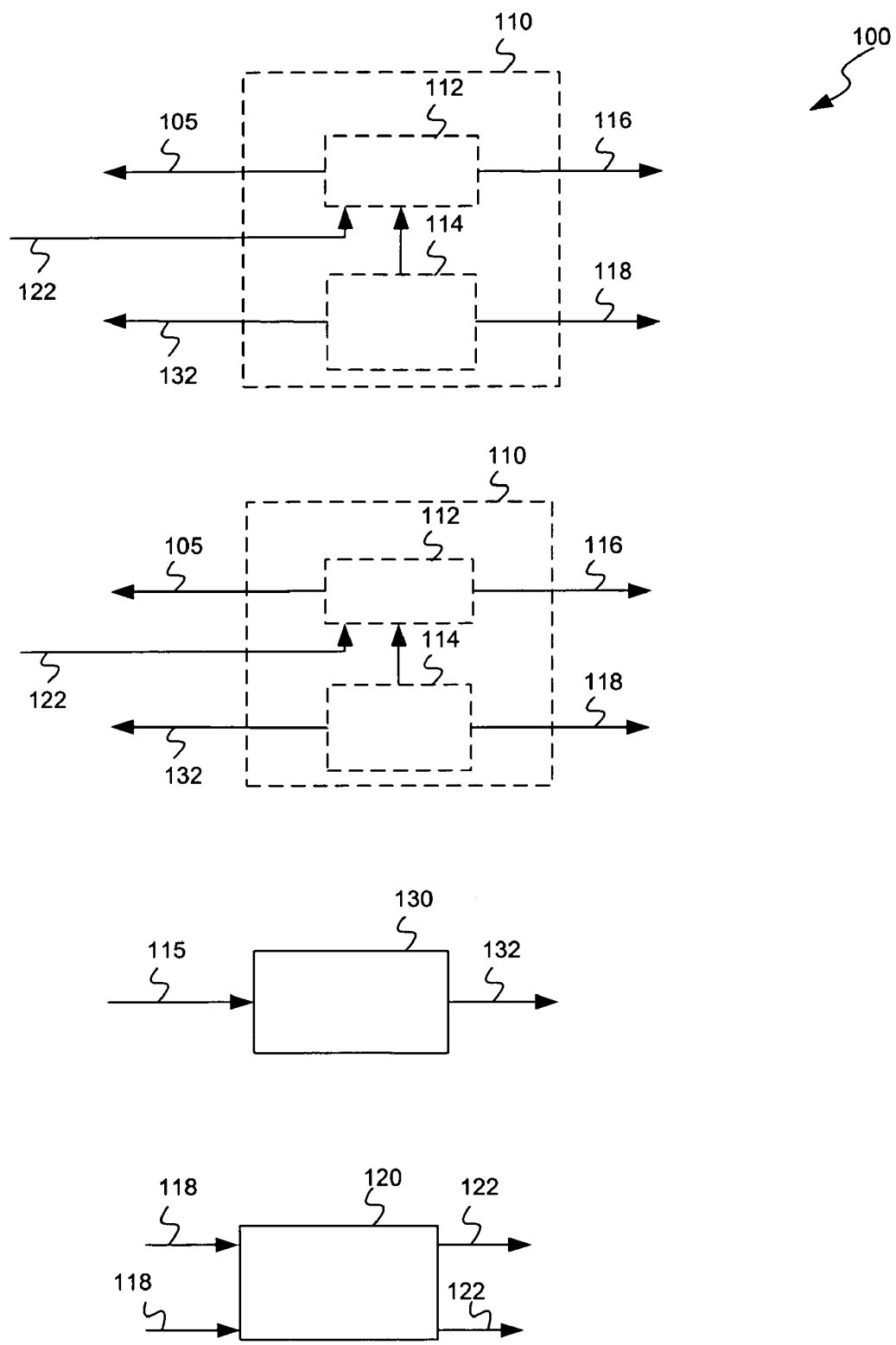
FIG. 1 is a high-level block diagram of a signal deskewing circuit according to the present invention.

FIG. 1 is a high-level block diagram of a signal deskewing circuit 100 according to the present invention. As shown in FIG. 1, signal deskewing circuit 100 receives two or more data signals 105 and a channel clock 115 from another device and removes skew between the two or more data signals to create deskewed data signals 116. In one embodiment, signal deskewing circuit 100 includes two or more data capture circuits 110, a delay line controller 120 and a channel clock interface 130. Each data capture circuit 110 includes a delay line 112 and a skew detection circuit 114 connected to delay line 112. Delay line controller 120 is connected to each delay line 112 and each skew detection circuit 114. Delay line controller 120 receives skew indicator signals 118 representing skew from each of the skew detection circuits 114 and controls the delay added by each of the delay lines 112 via control 122. Channel clock interface 130 receives channel clock 115, doubles its frequency to form doubled channel clock 132 and drives each skew detection circuit 114 with doubled channel clock 132.

Figure 2:
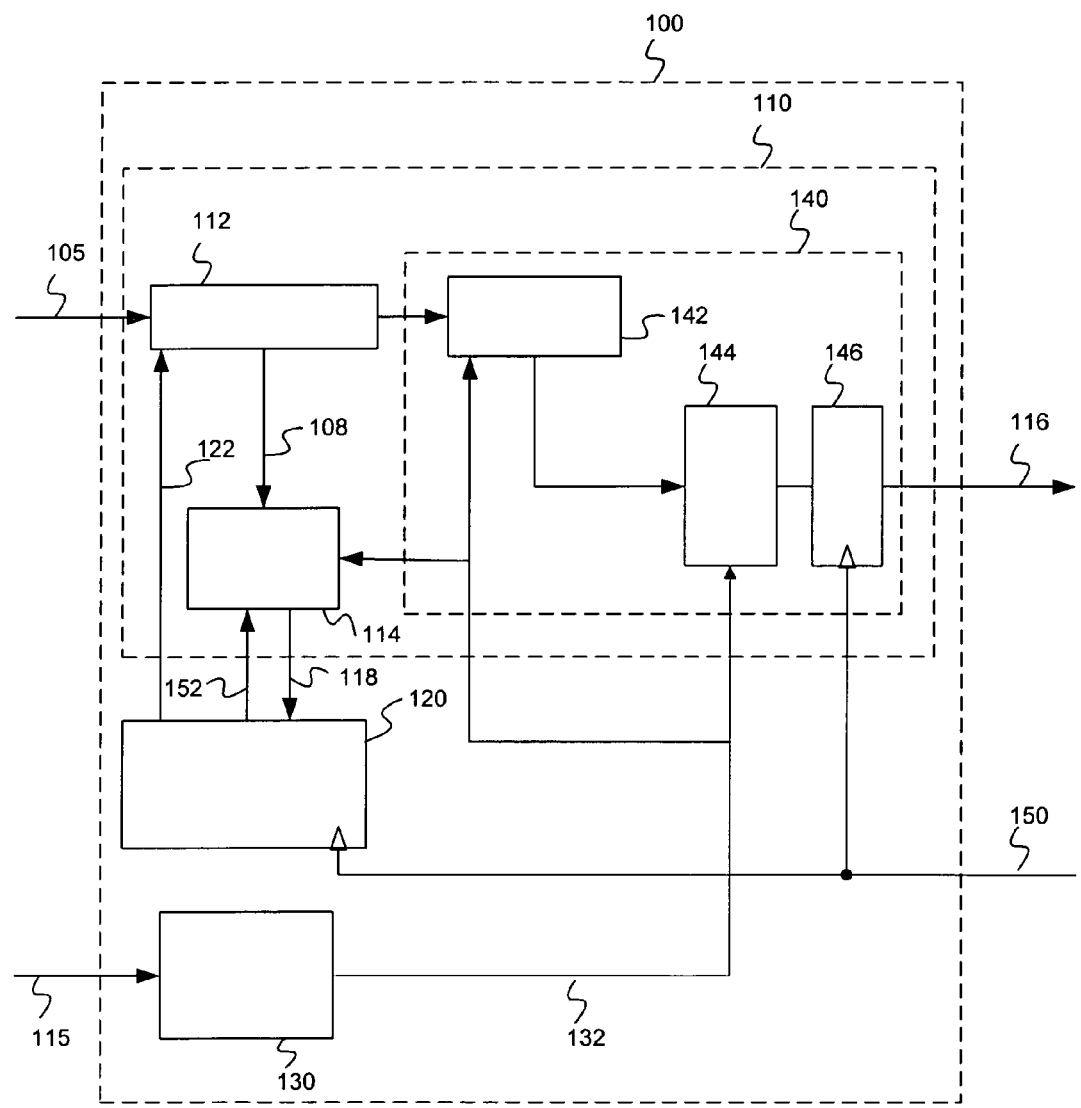
FIG. 2 shows one embodiment of the signal deskewing circuit of FIG. 1.

One embodiment of deskewing circuit 100 is shown in more detail in FIG. 2. In the embodiment shown in FIG. 2, data capture circuit 110 includes delay line 112, skew detection circuit 114 and synchronizer circuit 140. Synchronizer circuit 140 is used to synchronize data received on data signals 105 to a core clock 150. In one embodiment, synchronizer circuit 140 includes a serial to parallel converter 142, a sampler 144 and an output register 146. Serial to parallel converter 142 and sampler 144 are clocked with doubled channel clock 132. Output register 146 is clocked with core clock 150. In one such embodiment, serial to parallel converter 142 is a four bit shift register.

In another embodiment (not shown), synchronizer circuit 140 includes a sampler 144 and an output register 146. Sampler 144 is clocked with doubled channel clock 132. Output register 146 is clocked with core clock 150.

In one embodiment, such as is shown in FIG. 2, delay line controller 120 is clocked by core clock 150. In one such embodiment, delay line controller 120 outputs a sample signal 152 used to drive each skew detection circuit 114 in a method that will be described below.

In one embodiment, channel clock interface 130 includes a delay line to allow for additional clock delay. In one such embodiment, delay line controller 120 processes skew indicator signals 118 to minimize the skew between data bits and to optimally delay the doubled channel clock with respect to a predetermined timing scheme. Delay line controller 120 determines the amount of delay a signal 105 requires and through one or more control lines 122 dictates the specific behavior of each delay line 112.

In one embodiment, each delay line 112 sends a processed channel data signal 108 to skew detection circuit 114. Skew detection circuit 114 compares the phase of the processed channel data signal 108 to the phase of the doubled channel clock 132 supplied by channel clock interface 130. At the completion of this phase comparison skew detection circuit 114 generates a skew indicator signal 118 representing skew detected in each data channel. In one such embodiment, skew indicator signal 118 includes a clock early signal which is active when the reference clock signal edge is early relative to the data edge and a data early signal which is active when the data edge is early relative to the reference clock signal edge.

Delay line controller 120 receives the phase comparison information via skew indicator signal 118 and determines whether additional delay adjustments are required. Since any individual phase comparison would be subject to significant error due to data edge jitter, a large number of samples are required before an updated estimate of data "early" or "late" can be made. (In one embodiment, a minimum of 256 samples are required before an updated estimate of data "early" or "late" can be made.)

In one embodiment, individual phase comparisons are digitally filtered inside delay line controller 120 prior to any delay adjustments being made to the clock or data signals.

Figure 3:
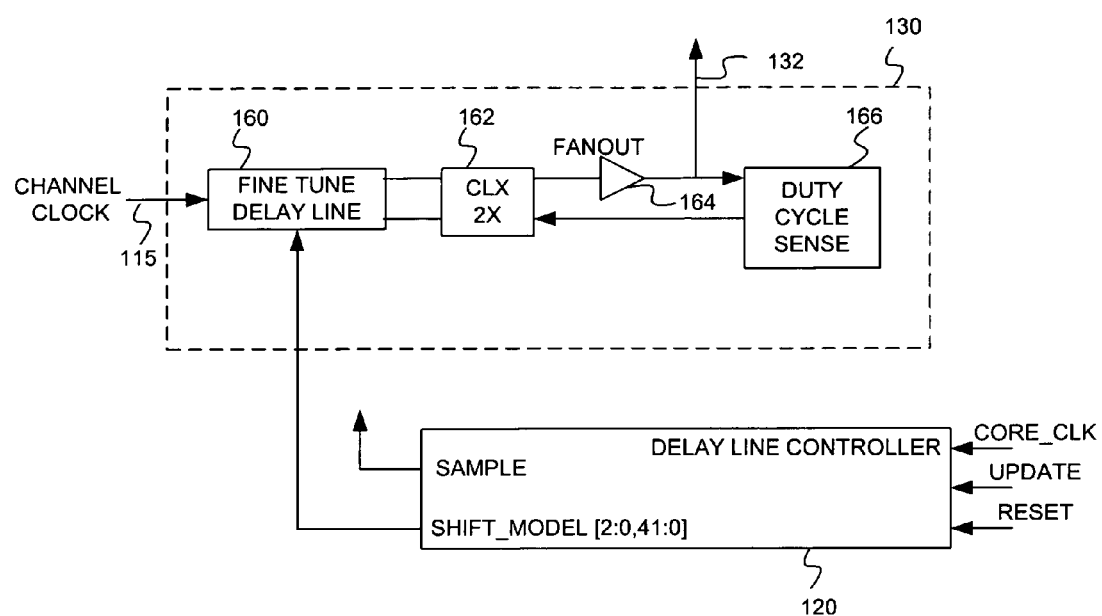
FIG. 3 illustrates one embodiment of the channel clock interface and delay line controller of FIG. 2.

In the embodiment shown in FIG. 2, skew detection circuit 114 is driven by a signal 132 produced by channel clock interface 130. In one embodiment, channel clock interface 130 doubles the frequency of channel clock 115 and drives skew detection circuit 114 with the doubled channel clock 132. In one such embodiment, such as is shown in FIG. 3, channel clock interface 132 includes a fine tune delay line 160, a frequency doubler 162 and a fanout 164. Fine tune delay line delays channel clock 115 under control of delay line controller 120. The resulting channel clock is frequency doubled using frequency doubler 162 and buffered with fanout 164.

In one embodiment, a duty cycle sense circuit 166 is used to ensure that doubled channel clock 132 has approximately a 50 percent duty cycle. In one such embodiment, doubled channel clock 132 has a positive duty cycle of 45–55%.

In one embodiment, serial to parallel converter 142 receives data from delay line 112 and converts the data to a parallel format. The data is then shifted, in parallel, to sampling circuit 144. In one embodiment, sampling circuit 144 samples the parallel data read from serial to parallel converter 142 such that it can be latched by output register 146. Output register 146 drives deskewed data signal 116 with a deskewed data signal synchronized to core clock 150.

Figure 4:
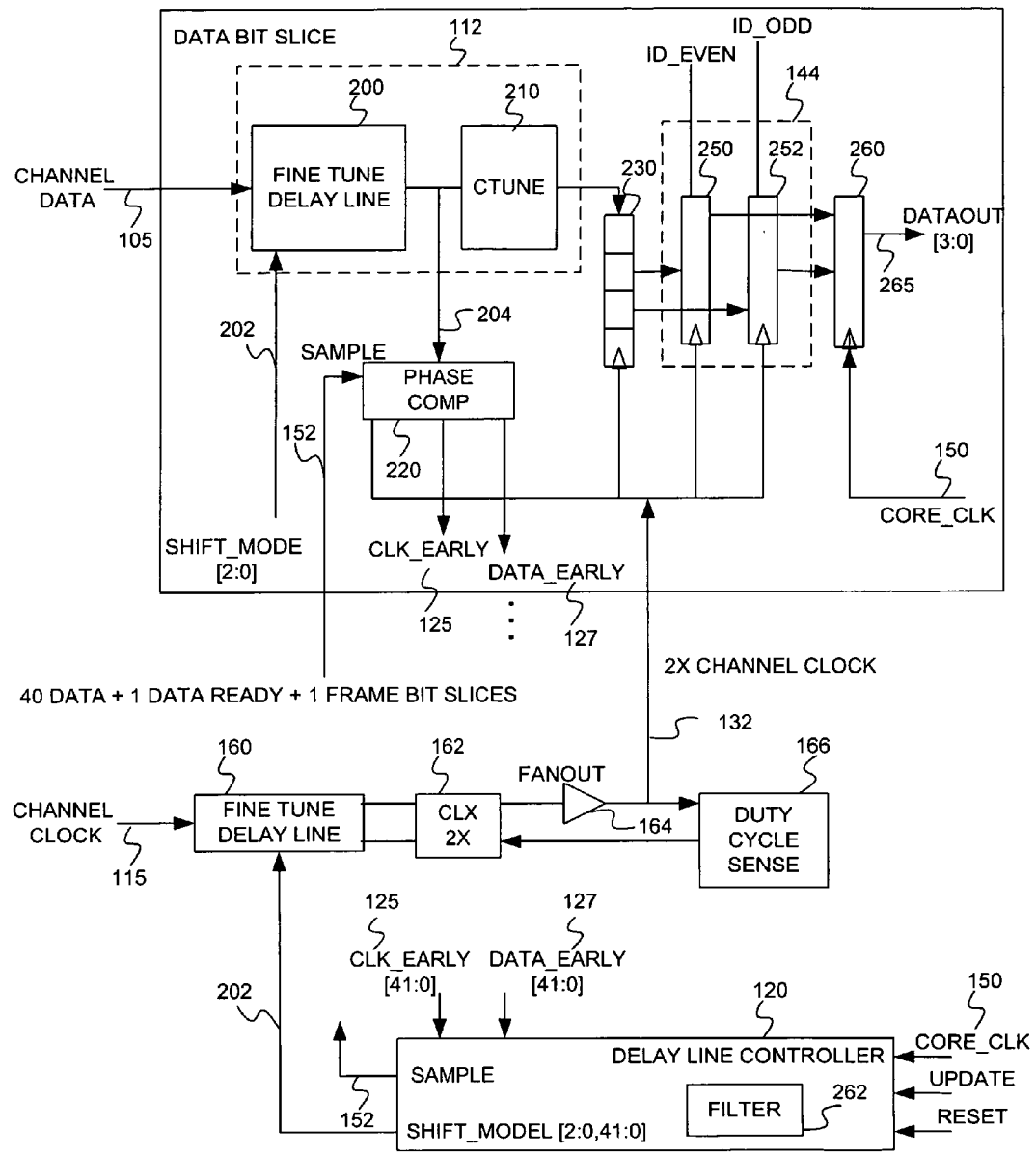
FIG. 4 shows another embodiment of the signal deskewing circuit of FIG. 1.

FIG. 4 provides a more detailed illustration of one embodiment of a signal deskewing circuit 100 according to the present invention. In the embodiment shown in FIG. 4, delay line 112 includes a fine tune delay line 200 and a coarse tune delay line 210. Skew detection circuit 114 includes a phase comparator 220 which receives a sample signal 152 from delay line controller 120 and generates a clock early signal 125 and a data early signal 127. In one embodiment, coarse tune delay line 210 adds additional delay to the parallel data signals, as needed, in increments of the doubled channel clock period.

In the embodiment shown in FIG. 4, four bit shift register 230 receives data from coarse tune delay line 210 and generates four bit nibbles representative of groups of four bits receives on channel data 105. Sampler 144 includes an even sample register 250 and an odd sample register 252. Each sample register is clocked with doubled channel clock 132. In the embodiment shown, each group of eight bits is split into an even nibble and an odd nibble. Even nibbles are stored in even sample register 250. Odd nibbles are stored in odd sample register 252. In the embodiment shown, output register 146 is a dual input register 260. Register 260 samples each of even sample register 250 and odd sample register 252 in a ping pong fashion on alternate cycles of core clock 150 to come up with a four bit data out 265 synchronized to core clock 150.

In the embodiment shown in FIG. 4, fine tune delay line 200 is controlled via control line 202. In one embodiment, control line 202 includes an enable bit for channel clock interface 130 and for each data capture circuit 110. In addition, control line 202 includes a three bit shift_mode signal driven to each of the data capture circuits 110 and to clock interface 130. In one such embodiment, the three bit shift_mode signal and the enable bit are used to control mode selection registers within each of the fine tune delay lines 200, 160. In one embodiment, thermometer encoding is used within each of the fine tune delay lines to configure delay. A more detailed description of fine tune delay lines is provided in "A Programmable Differential Delay Circuit with Fine Tune Adjustment", filed herewith, which is hereby incorporated by reference.

Figure 5:
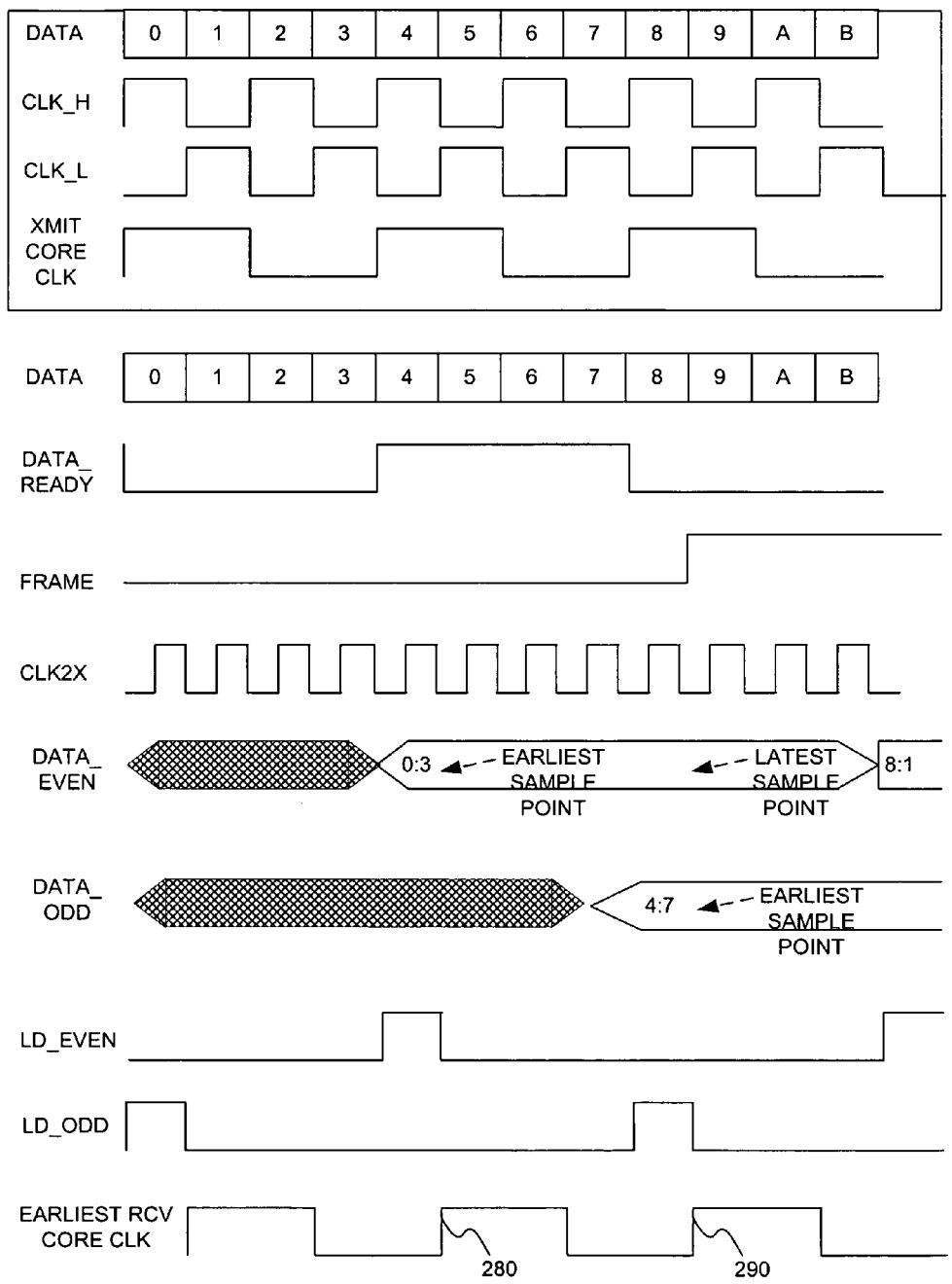
FIG. 5 is a timing diagram showing the relationship between signals in a communications channel.

FIG. 5 illustrates timing relationships between channel data, handshake, and clock at the transmit end and at the receive end. In the example shown, the shaded signals are from the transmit side while the non-shaded signals are at the receive side. Arrows 280 and 290 represent the earliest and latest point in time, respectively, at which Data_Even and Data_Out can be sampled into the core of the device (given the premise that the output of the two stage synchronizer must be a logic 0 to accept the Even/Odd data).

Figure 6:
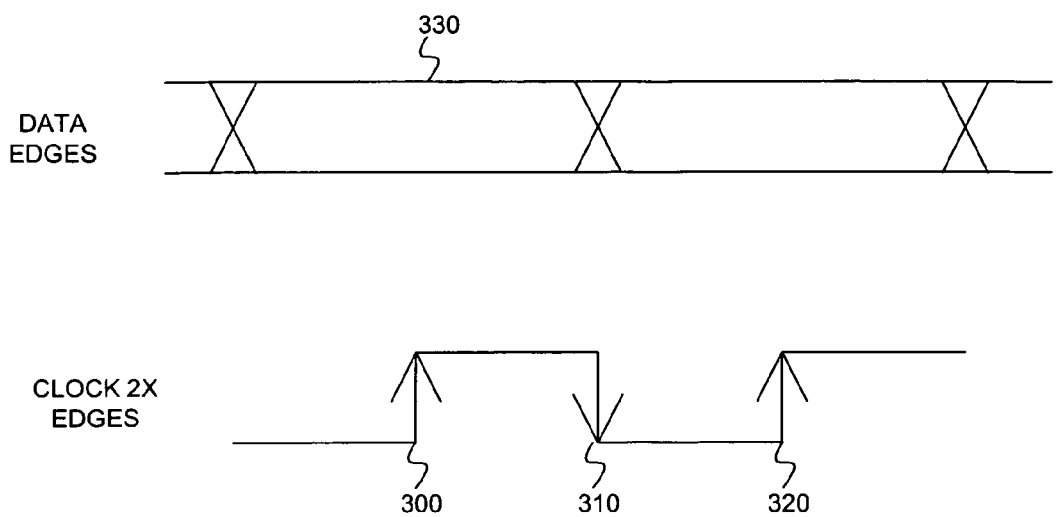
FIG. 6 provides an illustration of a skew incident.

FIG. 6 provides an illustration of a simplified timing diagram showing how a skew incident is found, according to the present invention. Doubled clock signal 132, Clk2x, drives phase comparator 220, within skew detection circuit 114, with three consecutive edges: an up 300, a down 310 and another up 320. The signal data will be sampled at each of the consecutive edges (300, 310, 320). For example, if on the first edge 300 of Clk2x high data is captured and on the third edge of Clk2x 320 3 low data is captured, one knows a transition on the data signal has occurred between those two clk2x edges. Note, in this particular embodiment of this invention, the clk2x signal must be twice the frequency of the data signal and must be run with a 50% duty cycle. By placing the clock and the data in this relationship, the rising edge will occur in the middle of the data during a valid state, and the second clk2x edge will occur during a data transition, resulting in an uncertain sample, 330. That positioning will achieve optimal positioning of the clock. As a result, one knows that if high data is captured on the second edge of clk2x 310 then it is known the clock is early and a clock early signal 125 is activated. On the other hand if low data is captured on the second edge of clk2x then data is early and a data early signal 127 is activated. In other words, one samples at three consecutive clock edges and if the first and third edges are different, then the data made a transition. By examining the data captured at the second edge one can determine whether the clock was early or if the data was early. This approach will optimally position the clock edge even if the setup and hold requirements of the capturing device are not identical.

In one embodiment, bit deskew and clock centering circuitry is added to independently center the capture clock within the center of each data eye. In one such embodiment, deskew is achieved by adding additional delay to "early" arriving signals so that they match the "latest" arriving signal.

In one embodiment, delay is added to the clock or data signals to position the channel clock within the data eye. Delay line controller 120 maintains minimum latency through the delay lines once this objective is met.

In the embodiment shown in FIG. 4, delay lines 112 include a fine tune delay line 200 and a coarse tune delay line 210. In one such embodiment, fine tune delay line 200 provides a minimum of 1.5 ns of fine tune deskew range in less than 90 ps step sizes. Other increments could be used to offer greater or lesser degrees of fine tuning. In addition, the number of fine tune stages could increase or decrease to provide more or less than the 1.5 ns of fine tune deskew range.

In one embodiment, fine tune delay line 200 includes a number of differential delay circuits. In the embodiment described in the patent application entitled "A Programmable Differential Delay Circuit with Fine Tune Adjustment" discussed above, an internal multiplexing scheme eases many timing and physical design concerns encountered when selecting between tap points distributed along a long delay line.

In one embodiment, coarse tune delay line 210 provides a frequency dependent amount of additional delay (1, 2, or 3 clock cycles) which corresponds to a range of 2.5 ns at signaling rates of 800 Mb/s. The coarse tuning technique uses the frame signal shown in FIG. 5 as a reference and can deskew ±one clock cycle of delay variation with respect to the signal. In a bidirectional signaling embodiment, two independent frame signals traveling in opposite directions are used.

In one embodiment, channel clock 115 is nominally delayed from channel data 105 by half of a bit duration. In one such embodiment, this delay takes place on the transmit side of the link either by launching channel clock 115 off of the opposite edge of the transmit clock than that used to launch channel data 105 or by launching clock 115 and data 105 off of the same transmit clock and then delaying clock 115 with additional PCB foil trace length.

In one embodiment, phase comparator 220 is a digital sample and hold phase comparator used to establish the phase relationship between double channel clock 132 and fine tuned deskewed data 204. Since, as is noted above, any individual phase comparison would be subject to significant error due to data edge jitter, a minimum of 256 samples are required before an updated estimate of data "early" or "late" can be made.

In one embodiment, an initial training sequence is required to deskew and center the date and clock. To facilitate this, in one such embodiment, the channel protocol includes an initial start-up sequence. The initial start-up sequence provides a sufficiently long sequence of data edges to guarantee that delay line controller 120 can deskew the data using fine tune delay line 200.

At the end of the start-up sequence, a one-time coarse tune sequence is initiated. The coarse tune sequence is required because the phase comparator has phase ambiguity if channel clock 115 is skewed from data 105 by more than ±Tbit/2. In other words, phase comparator 220 cannot distinguish whether the Nth clock edge is being compared to the Nth data eye or the (N−1)th or (N+1)th data eyes.

Figure 7:
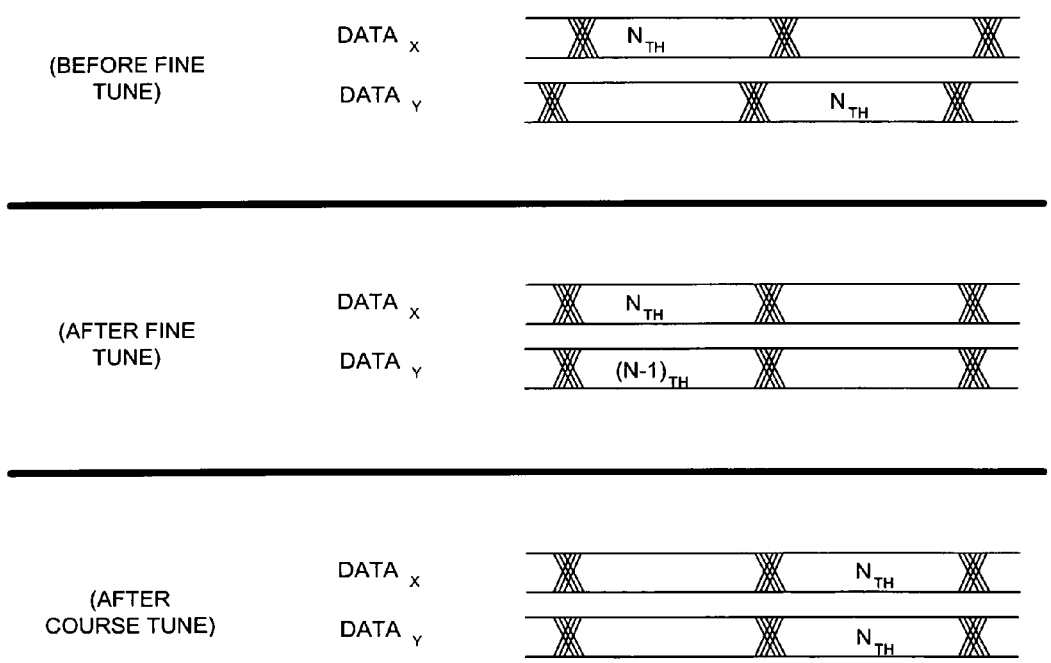
FIG. 7 illustrates coarse correction according to the present invention.

To counter this, in one embodiment, the one-time coarse tuning sequence is used to re-align all data bits which have slipped beyond the resolution of phase comparator 220. In one embodiment, logic within the frame data bit slice is designed to detect a unique coarse tuning sequence (e.g., '110011') sent on the incoming frame signal. Upon detection, a CTUNE pulse is generated and fanned out to all the data bit slices, data ready and frame. The CTUNE pulse delays the incoming data by one, two or three doubled channel clocks 132 prior to entering the serial to parallel converter, after determining if the data is early, nominal or late with respect to the CTUNE pulse. An example of this correction is shown in FIG. 7.

If none of the slices has late arriving data leading to cycle slip (determined, e.g., by a logical OR of all the data, data ready and frame 'late' signals), then, in one embodiment, all the data travels through one less coarse tune flip flop of delay to reduce the overall latency by one doubled channel clock cycle.

In the embodiment discussed above, circuitry in coarse tuning delay circuit 210 can be used to deskew all data bits as long as there is not more than one clock cycle slip in either direction between any individual data or data ready bit relative to the frame signal (the frame signal acts as a coarse tune reference point). This range can easily be increased to any arbitrary limit with additional circuitry.

Figure 8A:
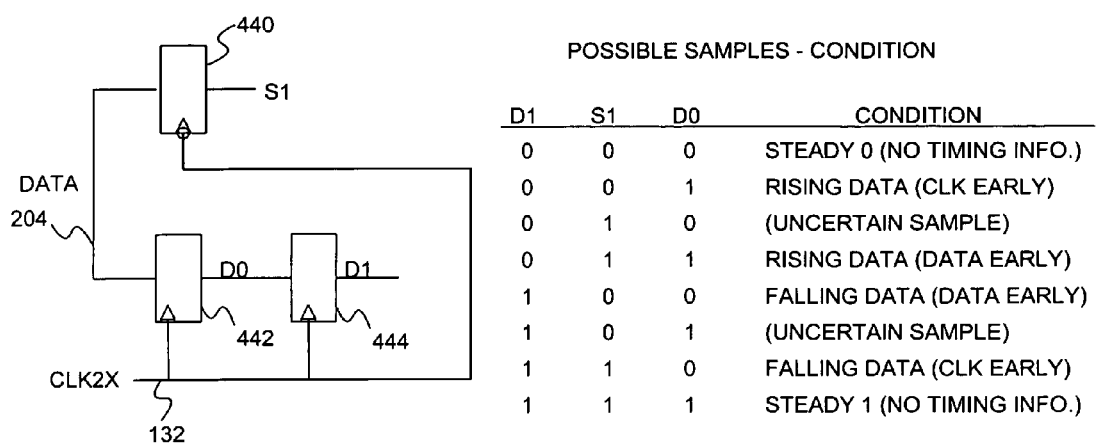
FIGS. 8*a–c* illustrate a phase comparator which can be used in deskewing circuits according to the present invention.
Figure 8B:
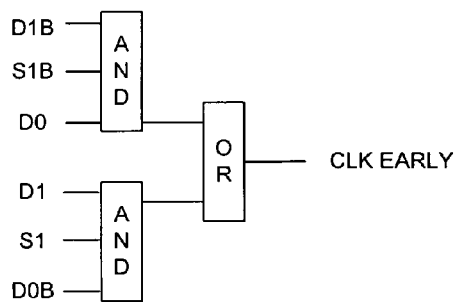
Figure 8C:
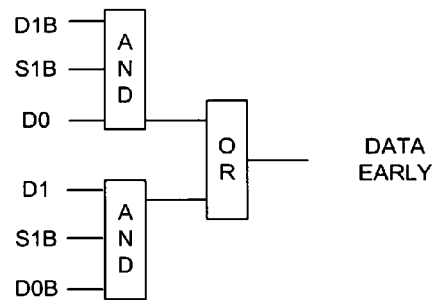

In one embodiment, each data, data-ready and frame signal is deskewed by a separate bit slice deskew circuit 110. Phase comparators 220 within each bit slice produce an output which indicates whether doubled channel clock 132 is early or late with respect to the optimal clock position. A simplified diagram of phase comparator 220 is shown in FIGS. 8a–c. Phase comparator 220 requires a 50% duty cycle clock with two edges per data bit. Double channel clock 132 provides such a clock. In one embodiment, phase comparator 220 includes flip-flops 440, 442 and 444. These flip-flops match flip-flops in data capture circuit 110 so that phase comparator 220 can properly position clock 132 in the data eye independent of the set up and hold requirements of the data capture flip flop. In one such embodiment, phase comparator 220 also includes logic (not shown) to hold the first phase comparison that occurs after the sample input signal goes active. Each sampling window is 16 bits wide. Therefore, consecutive comparisons should not be subject to cycle to next cycle correlations.

In one embodiment, delay line controller 120 includes circuitry to adaptively deskew delays between all data, data ready and frame bits and to optimally position capture clock 132 between opening and closing edges of the data eye. The deskew circuitry continuously monitors phase comparators 220 inside all data bit slices and periodically adjusts the tap settings of data and clock fine tune delay lines (200, 160) to optimally position the sampling clock. Controller 120 maintains minimum latency through delay lines 200 and 160 to minimize jitter added by the delay lines themselves. An overview of a feedback control system which can be used to control the Data, Data_Ready, Frame, and Clock delay lines is shown in FIG. 9.

Figure 9:
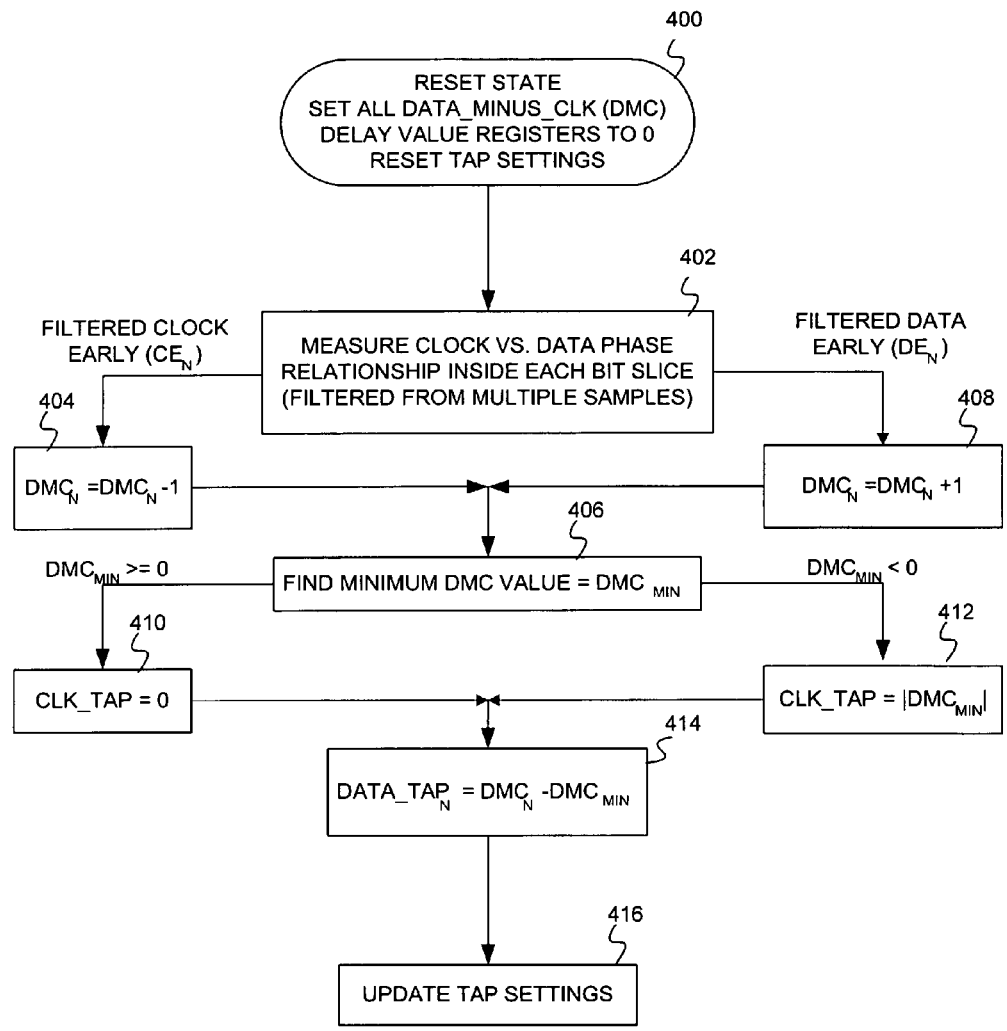
FIG. 9 illustrates a feedback control system algorithm used to control delay added to each of the signal and clock lines.

As can be seen in FIG. 9, at reset, control moves to 400 and all Data_Minus_Clock (DMC) delay value registers are set to 0. In addition, the tap settings in each delay line 200, 160 are reset to add the minimum delay. Control then moves to 402, wherein the clock vs. data phase relationship is analyzed for each bit slice (data, data_ready and frame signal each have their own bit slice). If filtered "clock early" is detected from any given bit slice, control moves to 404 and the corresponding DMC register is decremented by one. Control then moves to 406.

If, however, filtered "data early" is detected from any given bit slice, control moves to 408 and the corresponding DMC register is incremented by one. Control then moves to 406.

At 406 a determination is made of the minimum DMC value across all the bit slices. If the minimum DMC value is greater than or equal to zero, control moves to 410 and the clock delay is set to the minimum clock delay. Control then moves to 414.

If, however, the minimum DMC value is less than zero, control moves to 412 and the clock delay is set to the increment corresponding to the absolute value of the minimum DMC value. Control then moves to 414.

At 414, each bit slice delay line 200 is set to delay its data signal by the difference between its DMC value and the minimum DMC value. Control then moves to 402 and the process begins again.

Figure 10:
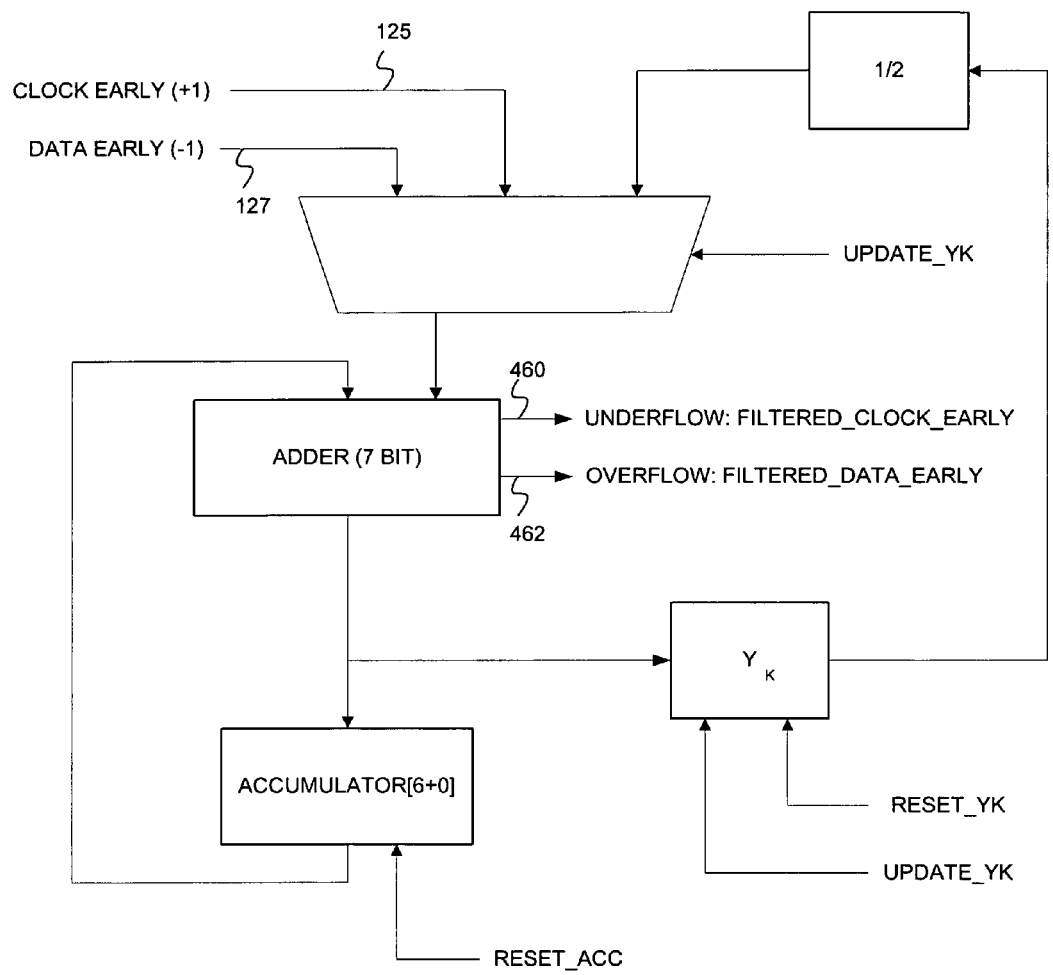
FIG. 10 illustrates a digital filter.

Since, as is noted above, any given phase comparison is subject to data edge jitter (i.e., noise which may exceed ±200 ps), many samples are observed before an estimate of the relative channel clock/channel data relationship is made. In one embodiment, such as is shown in FIGS. 4 and 10, a digital filter 262 can be used in delay line controller 120 to compute an estimate of the data-clock phase relationship for each data slice by computing a running accumulation (with fading memory) of the individual "clock early" and "data early" comparisons for each data and data ready signal. In one embodiment, a separate digital filter 262 is provided for each data and data ready signal.

The filter of FIG. 10 implements the recursive relationship: $Y_k = ACC_k + \frac{1}{2} * Y_{k-1}$, where $ACC_k$ is the accumulated sum of approximately the last 128 samples. Filtered outputs 460 and 462 go active only if $Y_k$ overflows or underflows (this should require a minimum of approximately 256 samples from when $Y_0 = 0$). The benefit of the digital filter is that the noise is being sampled a minimum of 256 times before a new phase estimate is made. Since the variance of the average of N samples of a random variable is 1/sqrt(N) times as large as the variance of a single sample, filtering a large number of samples dramatically reduces the the error associated with data edge jitter.

If there are not a sufficient number of data transitions, filter 262 will not allow the delay line to change state. In one embodiment, fine tune delay line 200 can update in as short of time as Tclk*1024=5 ns*1024 or 5.12 us. An individual update can cause the data delay to move relative to the clock delay by +/−one tap setting (45 ps/90 ps increments best case (BC)/worst case (WC)). In order to deskew 1250 ps of skew, one tap setting at a time (BC) will require 150 us, assuming sufficient data transitions. This should be adequate for tracking delay variations due to environmental factors such as voltage and temperature.

Figure 11:
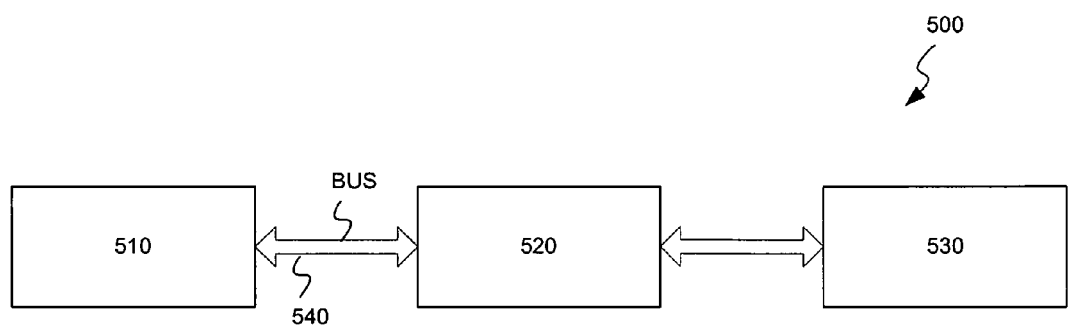
FIG. 11 illustrates an electronic system using the signal deskewing circuit of the present invention.

FIG. 11 is a block diagram illustrating an electronic data processing system 500 constructed to take advantage of the present invention. Electronic data processing system 500 includes two or more electronic devices 510, 530 (e.g., a processor unit 510 connected to a memory device 530) connected by a communication interface 540 having a signal deskewing circuit 520 as described and presented in detail above in connection with FIGS. 1–10 above. In one embodiment, interface 540 includes two or more channel data lines and a separate channel clock line. In one such embodiment, system 500 is implemented on a single semiconductor wafer. In an alternative embodiment, device 510 and device 530 are implemented as two separate integrated circuits.

In one embodiment, each of the devices 510, 530 include an integral communications interface; each communications interface includes a signal deskewing circuit 100 (not shown) as described and presented in detail above in connection with FIGS. 1–4 above.

CONCLUSION

Thus, novel structures and methods for reducing the skew on signals transmitted between electrical components while reducing both engineering and material costs related to achieving low skew occurrence in data signals has been described.

When transferring parallel data across a data link, variations in data path delay or an imperfectly positioned capture clock edge limit the maximum rate at which data can be transferred. Consequently, a premium is spent in engineering design time and material cost to realize a low skew data links with proper clock-data phase relationship. In one particular area, electrical cables, some have been paying a very high premium for low skew properties. This invention should dramatically relax the low skew requirement of similar cables and consequently reduce costs as they become easier to manufacture allowing more than a single vendor to produce. One should expect to achieve faster communication rates with this invention and thus the achievement of a higher premiums on products that implement this invention.

In one embodiment of the present invention, this invention compensates data path delays by adding additional delay to the early arriving signal until they match the delay of the latest arriving signal. Furthermore, if the clock which is to capture this data is early or late with respect to a optimal quadrature placement (depending on latch setup/hold requirement) additional data or clock path delay is added to optimally position all data with respect to the capturing clock.

This can be strategically important because it affords a way to either dramatically cut costs or achieve higher performance in an area where many in the affected industries would not without equivalent functionality. Much of system cost is based on commodity parts (e.g. Microprocessors, Memory), which most industry participants pays an equal price for, so in areas where one uses unique parts (e.g. cables) it is a strong advantage to be able to find much less expensive solutions to the problem of variations in data path delay when transferring parallel data cross a data link, in order to command higher product margins.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

The invention claimed is:

1. A method of reducing skew between a plurality of signals transmitted with a transmit clock, wherein the plurality of signals includes a first signal and a second signal, the method comprising:
   receiving the transmit clock and each of the plurality of signals;
   detecting skew between the received transmit clock and each of the received signals;
   adding delay to one or more of the plurality of received signals to compensate for the detected skew;
   phase comparing each of the plurality of delayed signals to a reference signal to detect changes in the detected skew, wherein phase comparing includes generating a clock early signal and a data early signal for each of the plurality of signals; and
   modifying the delay added to each of the plurality of delayed signals to adapt to changes in the detected skew;
   wherein adding delay includes:
   passing each of the plurality of received signals through a separate delay line; and
   setting delay as a function of the clock early and data early signals, wherein setting delay includes determining a minimum latency through the delay lines.

2. The method of claim 1, wherein each delay line includes a plurality of taps and wherein setting delay includes selecting one of the plurality of taps.

3. The method of claim 1, wherein each delay line includes a plurality of feedback positions and wherein setting delay includes selecting one of the plurality of feedback positions.

4. A method of reducing skew between a plurality of signals transmitted with a transmit clock, wherein the plurality of signals includes a first signal and a second signal, the method comprising:
   receiving the transmit clock and each of the plurality of signals;
   detecting skew between the received transmit clock and each of the received signals;
   adding delay to one or more of the plurality of received signals to compensate for the detected skew;
   phase comparing each of the plurality of delayed signals to a reference signal to detect changes in the detected skew; and
   modifying the delay added to each of the plurality of delayed signals to adapt to changes in the detected skew;
   wherein detecting skew includes:
   doubling the received transmit clock to form a doubled clock; and
   clocking a phase comparator circuit with the doubled clock.

5. The method of claim 4, wherein phase comparing includes generating a clock early signal and a data early signal for each of the plurality of signals.

6. The method of claim 4, wherein the phase comparator circuit generates a clock early signal and a data early signal for each of the plurality of received signals and wherein adding delay includes:
   passing each of the plurality of received signals through a separate delay line; and
   setting delay as a function of the clock early and data early signals, wherein setting delay includes determining a minimum latency through the delay lines.

7. The method of claim 6, wherein each delay line includes a plurality of taps and wherein setting delay includes selecting one of the plurality of taps.

8. The method of claim 6, wherein each delay line includes a plurality of feedback positions and wherein setting delay includes selecting one of the plurality of feedback positions.

9. The method of claim 4, wherein adding delay includes capturing each of the plurality of received signals in an output register.

10. A circuit for reducing skew between a plurality of signals transmitted with a channel clock, wherein the plurality of signals includes a first and a second signal, the circuit comprising:
    a first data capture circuit connected to the first signal, wherein the first data capture circuit includes a first delay line and a first skew detection circuit connected to the first delay line;
    a second data capture circuit connected to the second signal, wherein the second data capture circuit includes a second delay line and a second skew detection circuit connected to the second delay line;
    a delay line controller connected to the first and second delay lines and the first and second skew detection circuits, wherein the delay line controller receives skew indicator signals representing skew from each of said first and second skew detection circuits and controls delay added by said first and second delay lines; and
    a channel clock interface connected to the first and second skew detection circuits, wherein said channel clock interface frequency doubles the channel clock to form a doubled channel clock;
    wherein the first and second skew detection circuits detect skew as a function of the doubled channel clock.

11. The circuit of claim 10, wherein each data capture circuit further includes an output register synchronized to a local clock.

12. The circuit of claim 10, wherein the first skew detection circuit includes a phase comparator for comparing phase of the doubled channel clock to the first signal and wherein the second skew detection circuit includes a phase comparator for comparing phase of the doubled channel clock to the second signal.

13. The circuit of claim 12, wherein the delay line controller includes a digital filter connected to each of the phase comparators.

14. The circuit of claim 10, wherein the delay line controller includes a digital filter connected to one of said skew indicator signals.

15. The circuit of claim 10, wherein the channel clock interface includes a duty cycle sensing circuit, wherein the duty cycle sensing circuit is connected to the doubled channel clock and wherein the duty cycle sensing circuit operates with the doubled channel clock to produce an approximately fifty percent duty cycle doubled channel clock.

16. The circuit of claim 10, wherein each data capture circuit further includes a serial to parallel converter connected to a sampling circuit, wherein the serial to parallel converter and the sampling circuit are clocked with the doubled channel clock.

17. The circuit of claim 16, wherein the sampling circuit includes a first and second register, wherein the signals are transmitted as bits, wherein the bits are grouped as odd and even groups of bits, and wherein even groups of bits are stored in the first register and odd groups of bits are stored in the second register.

18. The circuit of claim 16, wherein the serial to parallel converter is a four-bit shift register.

19. The circuit of claim 10, wherein each of the first and second delay lines include a fine tune delay line and a coarse tune delay line.

20. The circuit of claim 10, wherein the skew indicator signals include a clock early signal and a data early signal.

21. The circuit of claim 10, wherein a core clock signal drives the delay line controller and the output register.

22. The circuit of claim 10, wherein each skew detection circuit comprises a phase comparator, wherein the phase comparator compares phase of an input signal to a clock signal to generate a clock early signal and a data early signal.

23. The circuit of claim 22, wherein the phase comparators include a plurality of flip-flops.

24. A communication system, comprising:
a transmitter, wherein the transmitter transmits a plurality of signals in parallel, wherein the plurality of signals includes a first and a second signal; and
a receiver, wherein the receiver includes a deskewing circuit, wherein the deskewing circuit includes:
a first data capture circuit connected to the first signal, wherein the first data capture circuit includes a first delay line and a first skew detection circuit connected to the first delay line;
a second data capture circuit connected to the second signal, wherein the second data capture circuit includes a second delay line and a second skew detection circuit connected to the second delay line;
a delay line controller connected to the first and second delay lines and the first and second skew detection circuits, wherein the delay line controller receives skew indicator signals representing skew from each of said first and second skew detection circuits and controls delay added by said first and second delay lines; and
a channel clock interface connected to the first and second skew detection circuits, wherein said channel clock interface frequency doubles the channel clock to form a doubled channel clock;
wherein the first and second skew detection circuits detect skew as a function of the doubled channel clock.

25. The communication system of claim 24, wherein each data capture circuit further includes an output register synchronized to a local clock.

26. The communication system of claim 24, wherein the first skew detection circuit includes a phase comparator for comparing phase of the doubled channel clock to the first signal and wherein the second skew detection circuit includes a phase comparator for comparing phase of the doubled channel clock to the second signal.

27. The communication system of claim 26, wherein the delay line controller includes a digital filter connected to each of the phase comparators.

28. The communication system of claim 24, wherein the delay line controller includes a digital filter connected to one of said skew indicator signals.

29. The communication system of claim 24, wherein the channel clock interface includes a duty cycle sensing circuit, wherein the duty cycle sensing circuit is connected to the doubled channel clock and wherein the duty cycle sensing circuit operates with the doubled channel clock to produce an approximately fifty percent duty cycle doubled channel clock.

30. The communication system of claim 24, wherein each data capture circuit further includes a serial to parallel converter connected to a sampling circuit, wherein the serial to parallel converter and the sampling circuit are clocked with the doubled channel clock.

31. The communication system of claim 30, wherein the sampling circuit includes a first and second register, wherein the signals are transmitted as bits, wherein the bits are grouped as odd and even groups of bits, and wherein even groups of bits are stored in the first register and odd groups of bits are stored in the second register.

32. The communication system of claim 30, wherein the serial to parallel converter is a four-bit shift register.

33. The communication system of claim 24, wherein each of the first and second delay lines include a fine tune delay line and a coarse tune delay line.

34. The communication system of claim 24, wherein the skew indicator signals include a clock early signal and a data early signal.

35. The communication system of claim 24, wherein a core clock signal drives the delay line controller and the output register.

36. An integrated circuit, comprising:
a transmitter, wherein the transmitter transmits a plurality of signals in parallel, wherein the plurality of signals includes a first and a second signal; and
a receiver, wherein the receiver includes a deskewing circuit, wherein the deskewing circuit includes:
a first data capture circuit connected to the first signal, wherein the first data capture circuit includes a first delay line and a first skew detection circuit connected to the first delay line;
a second data capture circuit connected to the second signal, wherein the second data capture circuit includes a second delay line and a second skew detection circuit connected to the second delay line;
a delay line controller connected to the first and second delay lines and the first and second skew detection circuits, wherein the delay line controller receives skew indicator signals representing skew from each of said first and second skew detection circuits and controls delay added by said first and second delay lines; and a channel clock interface connected to the first and second skew detection circuits, wherein said channel clock interface frequency doubles the channel clock to form a doubled channel clock;

wherein the first and second skew detection circuits detect skew as a function of the doubled channel clock.

37. The circuit of claim 36, wherein each skew detection circuit comprises a phase comparator, wherein the phase comparator compares phase of an input signal to a clock signal to generate a clock early signal and a data early signal.

38. The circuit of claim 37, wherein the phase comparators include a plurality of flip-flops.

39. A method for establishing the phase relationship between a plurality of signals, including a first signal, wherein the plurality of signals are transmitted with a channel clock, the method comprising:

initializing signal deskewing circuitry, wherein initializing includes driving the circuitry with a predefined sequence of data edges;

providing a phase comparator;

receiving the channel clock;

frequency doubling the received channel clock to form a frequency doubled channel clock, wherein the frequency doubled channel clock has 2 edges per data bit and a 50% duty cycle;

driving the phase comparator with the frequency doubled channel clock, wherein driving includes sensing the clock and determining an error signal indicating drift from the 50% duty cycle;

determining a phase relationship between the first signal and the clock;

setting delay for the first signal as a function of the phase relationship; and modifying the delay as a function of changes in the phase relationship.

40. The method of claim 39, wherein initializing the signal deskewing circuitry further includes establishing delay required in a coarse tune delay line.

41. In a system having a channel clock, a plurality of channel signals and delay lines for delaying the channel clock and the plurality of channel signals, a method of adaptively deskewing delays between the plurality of channel signals, comprising:

determining phase relationships between the channel clock and the plurality of channel signals, wherein determining includes generating skew indicator signals for each of the plurality of signals;

filtering each skew indicator signal to reduce jitter;

initializing a data minus clock (DMC) value for each channel signal;

increasing the value of the DMC value corresponding to a particular signal if that signal arrives early with respect to a reference signal;

decreasing the value of the DMC value corresponding to a particular signal if that signal arrives late with respect to the reference signal;

determining a minimum DMC value from the plurality of DMC values;

if the minimum DMC value is greater than zero, setting delay of the clock delay line to a minimum;

if the minimum DMC value is less than zero, setting delay of the clock delay line to the absolute value of the minimum DMC value;

calculating a channel signal delay for each of the channel signals, wherein calculating a delay includes determining a difference between the minimum DMC value and the DMC value corresponding to each of the plurality of channel signals; and setting delay of each of the channel signal delay lines to the channel signal delay calculated for each of the channel signals.

* * * * *

UNITED STATES PATENT AND TRADEMARK OFFICE
CERTIFICATE OF CORRECTION

PATENT NO. : 7,031,420 B1
APPLICATION NO. : 09/476678
DATED : April 18, 2006
INVENTOR(S) : Jenkins et al.

Page 1 of 1

It is certified that error appears in the above-identified patent and that said Letters Patent is hereby corrected as shown below:

On the TITLE page, in field (75), under "Inventors", in column 1, line 1, delete "Bau" and insert -- Eau --, therefor.

On the TITLE page, in field (56), under "Other Publications", in column 2, line 3, delete "2-54-2-60," and insert -- 2-54 – 2-60, --, therefor.

Signed and Sealed this

Eighth Day of August, 2006

JON W. DUDAS
*Director of the United States Patent and Trademark Office*